United States Patent [19]
Frechette

[11] Patent Number: 5,265,505
[45] Date of Patent: Nov. 30, 1993

[54] TURRET-LATHE COOLANT SYSTEM

[76] Inventor: Eugene L. Frechette, 49 Carmel La., Feeding Hills, Mass. 01030

[21] Appl. No.: 963,128

[22] Filed: Oct. 29, 1992

[51] Int. Cl.5 .......................................... B23Q 11/10
[52] U.S. Cl. ................................ 82/159; 409/136; 29/39; 82/152
[58] Field of Search ............... 82/121, 152, 158, 159; 407/11; 409/135, 136; 29/39; 408/35, 60, 61; 51/266

[56] References Cited

U.S. PATENT DOCUMENTS

| 354,498 | 12/1886 | Vanden Kerchove | 407/11 |
|---|---|---|---|
| 1,452,779 | 4/1923 | Barry | 408/61 |
| 2,437,605 | 3/1948 | Karge | 408/61 |
| 2,837,972 | 6/1958 | Knowles | 409/134 |
| 2,929,566 | 3/1960 | Paasche | 407/11 |
| 3,104,826 | 9/1963 | Morris | 407/11 |
| 3,726,363 | 4/1973 | Sussman | 184/39.1 |
| 3,868,195 | 2/1975 | Anderson et al. | 409/135 |
| 4,164,879 | 8/1979 | Martin | 409/136 |
| 4,442,576 | 4/1984 | Kitamura | 409/136 |
| 4,778,315 | 10/1988 | Duffy et al. | 409/136 |
| 4,919,232 | 4/1990 | Lofton | 184/6.26 |
| 5,168,614 | 12/1992 | Thumm | 408/35 |

FOREIGN PATENT DOCUMENTS 89419  7/1981  Japan .................... 409/135

Primary Examiner—Bruce M. Kisliuk
Assistant Examiner—Bryan Reichenbach
Attorney, Agent, or Firm—Richard H. Kosakowski

[57] ABSTRACT

A turret-lathe coolant system is disclosed for selectively directing a stream of coolant to an interface between a workpiece on a turret lathe and a cutting tool positioned by a turret to cut the workpiece. In the preferred embodiment, the system includes a coolant-discharge assembly secured to the turret, wherein the assembly has a plurality of semi-rigid coolant tubes that are affixed to coolant-distribution ports, to distribute coolant fluid to a plurality of cutting tools on the turret. A coolant plunger is affixed within the coolant-discharge assembly that includes coolant-discharge outlets that pass coolant fluid from within an interior chamber in the plunger through adjacent distribution ports in the assembly. A compound, four-bar linkage mechanism is pivotally secured to the coolant plunger and the lathe, to maintain the discharge outlets in the plunger in a fixed position relative to a rotational axis of the turret as the turret rotates and moves longitudinally and transversely along a bed of the lathe. The discharge outlets are positioned in alignment with the cutting tool positioned to cut the workpiece. Therefore, coolant fluid directed into the coolant plunger only passes out of the distribution tube adjacent the cutting tool positioned to cut the workpiece.

9 Claims, 4 Drawing Sheets

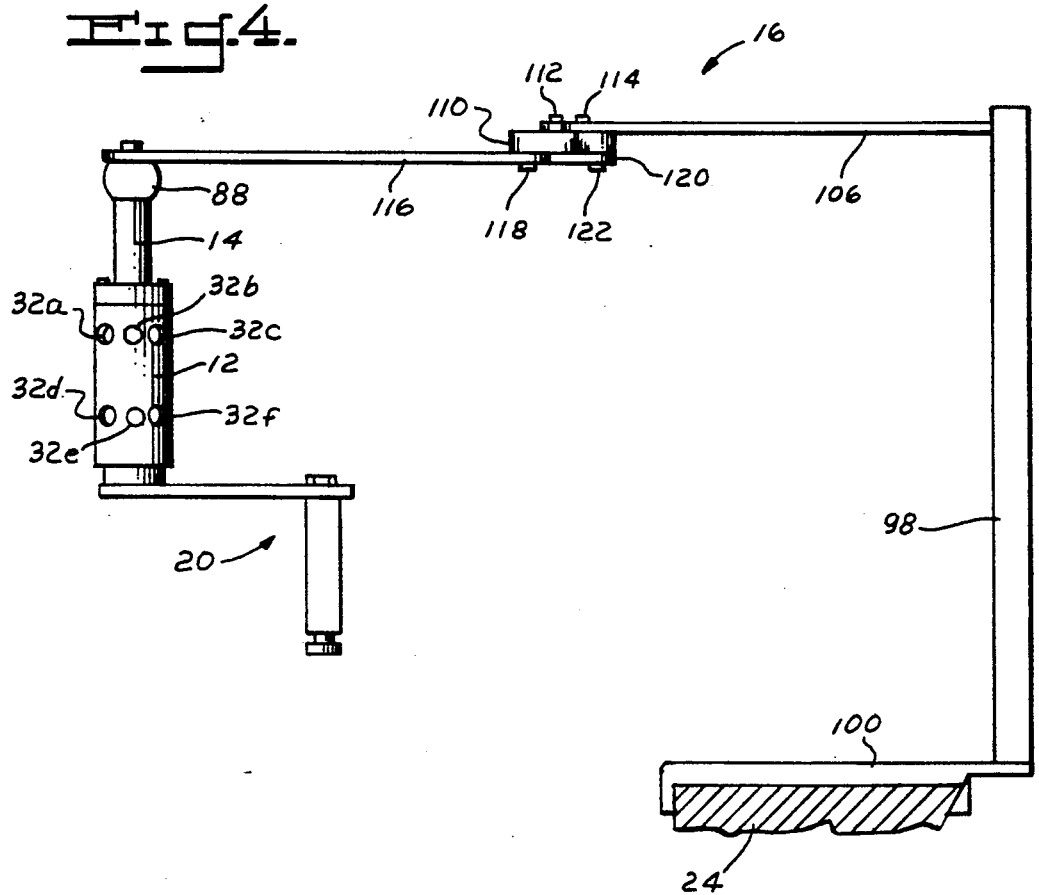
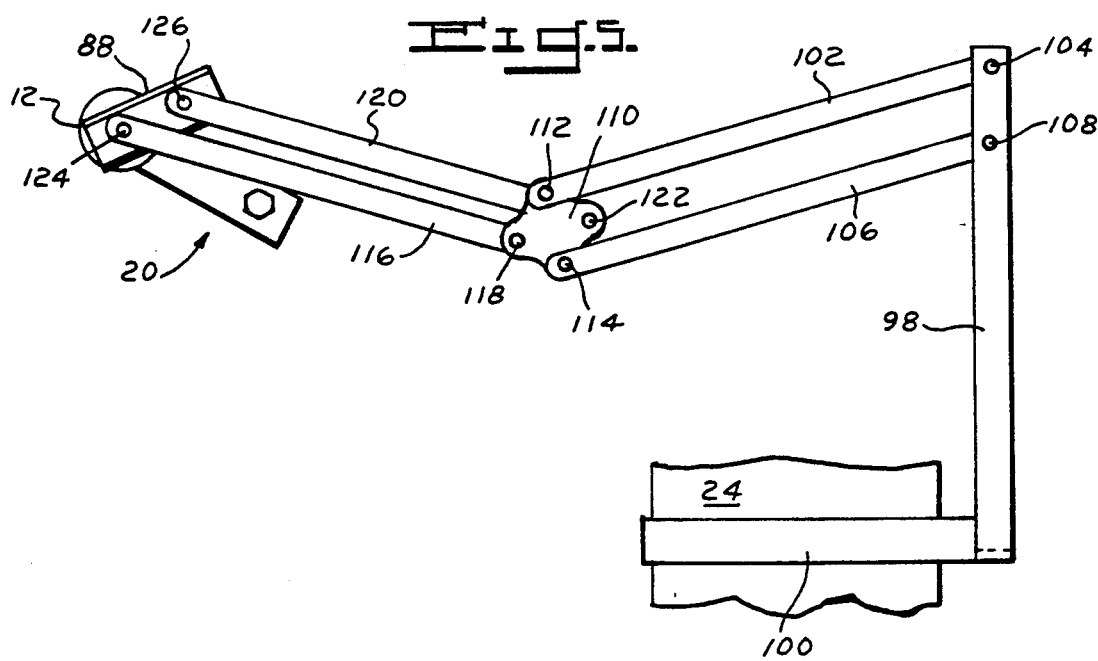

TURRET-LATHE COOLANT SYSTEM

BACKGROUND OF THE INVENTION

The present invention relates to a temperature control system for reducing heat generated by a machine tool cutting a workpiece. In particular, a turret-lathe coolant system is disclosed that can be retro-fitted onto a turret lathe, to selectively direct a stream of coolant fluid to an interface between the workpiece and only the specific tool in contact with the workpiece.

Turret lathes enhance efficiency of machining metal by permitting combined, multiple and successive cuts on a metal workpiece by different tools with only one "chucking" or setup of the workpiece in the lathe. Typically, the lathe is setup to rotatably secure the workpiece in a specific position. Next, a plurality of cutting tools on a rotatable turret are indexed to working positions with respect to the workpiece. The lathe then machines the workpiece by directing the turret to selectively move along a longitudinal (or "X") axis and/or a transverse (or "Z") axis until a first tool removes a specified amount of metal from the rotating workpiece. The turret then moves along the "X" and/or "Z" axis while rotating to position a second tool in contact with the workpiece, and so on, until all the indexed tools on the turret have cut the workpiece. For example, a hole in the workpiece may be drilled, bored and reamed at one chucking, by three different tools.

Contact between the workpiece and the metal cutting tools necessarily generates heat, which must be controlled to prevent metallurgical damage to the workpiece and tool. To control that heat, traditional turret-lathe coolant systems simply utilize a plurality of semi-rigid, adjustable hoses to direct a stream of coolant fluid at contact points between the cutting tools and the workpiece. The fluid removes excess heat while lubricating the workpiece and tool, thereby preventing damage. Such a system, however, is very inefficient, because turret lathes involve numerous contact points. Consequently, to cover all the contact points, a great deal of coolant fluid is wasted, because it is needlessly splashed at points on the workpiece that do not require cooling. Such fluid is not only expensive, but is increasingly considered a hazardous-waste material. Disposal costs of machine-tool coolant fluids frequently exceed purchase costs.

Many attempts have been made to increase the efficiency of turret-lathe coolant systems. Two such attempts are shown in U.S. Pat. No. 3,726,363 to Sussman, and in U.S. Pat. No. 4,164,879 to Martin. Both Sussman and Martin show turret-coolant systems that include a specific coolant line or conduit for each tool on the turret, so that fluid can be specifically directed to the contact points between the cutting tools and the workpiece. Additionally, both systems include a valve mechanism that permits coolant fluid to only flow along the turret to the cutting tool positioned to contact the workpiece, while prohibiting fluid from flowing to the other cutting tools on the turret.

The valve mechanisms in both Sussman and Martin, however, require that the turret be especially adapted so that a non-rotatable coolant-fluid distribution member is integrally affixed within the turret, in alignment with the rotational axis of the turret. Consequently, known high efficiency turret-lathe coolant systems require custom designed turrets. Therefore, due to inherent structural limitations, existing turret-lathe coolant systems cannot be retro-fitted onto existing turret lathes.

Accordingly, it is the general object of the present invention to provide an improved turret-lathe coolant system that overcomes the problems of the prior art.

It is a more specific object to provide a turret-lathe coolant system that can be retro-fitted onto existing turret lathes.

It is another specific object to provide a turret-lathe coolant system that can be utilized with existing turret lathes without having to modify the existing lathes.

It is yet another specific object to provide a turret-lathe coolant system that is more economical to produce, safer, and more reliable than existing coolant systems.

The above and other objects and advantages of this invention will become more readily apparent when the following description is read in conjunction with the accompanying drawings.

SUMMARY OF THE INVENTION

An improved turret-lathe coolant system is disclosed for selectively directing a stream of coolant to only a contact point between a workpiece on a turret lathe and the particular cutting tool machining the workpiece. In the preferred embodiment, the invention comprises a coolant-discharge assembly rotatably affixed to a turret on the turret lathe, so that a rotational axis of the coolant-discharge assembly is aligned with a rotational axis of the turret. A plurality of valved, semi-rigid coolant-distribution tubes are affixed to the discharge assembly, and adapted to adjustably direct coolant fluid from the assembly to a plurality of metal-cutting tools affixed to the turret.

A coolant plunger is affixed within the discharge assembly and adapted to selectively distribute coolant fluid only to coolant hoses aligned with a cutting tool positioned to cut the workpiece. The coolant plunger is connected to the bed of the lathe by a compound, four-bar linkage mechanism, so that coolant-discharge outlets in the plunger remain in a fixed position with respect to the rotational axis of the turret, as the turret moves in longitudinal and/or transverse axes, to position different cutting tools adjacent the workpiece.

In operation, coolant flows into the coolant plunger; through the discharge outlets in the plunger; through adjacent first distribution ports in the discharge assembly; and, along the coolant-distribution tubes adapted to direct the coolant to contact a first cutting tool in contact with the workpiece. As the turret moves the first cutting tool out of contact, and rotates to position a second cutting tool, the first distribution ports are rotated away from the plunger's discharge outlets and, therefore, stop transferring coolant. As a second cutting tool is positioned by the turret in an alignment to cut the workpiece, second distribution ports in the discharge assembly are aligned with the discharge outlets in the plunger, thereby transferring coolant to a second coolant tube adapted to direct the coolant to contact the second cutting tool. The coolant-discharge assembly and plunger continue to cooperate in that manner as the turret rotates to position all tools indexed to machine the workpiece, so that coolant only flows to contact the cutting tool machining the workpiece.

BRIEF DESCRIPTION OF THE DRAWINGS

FIG. 4 is a side plan view of some components of the turret-lathe coolant system, showing a compound, four-bar linkage mechanism securing the system to a bed of the turret lathe;

FIG. 5 is a top plan view of the FIG. 4 components; and

DETAILED DESCRIPTION OF THE PREFERRED EMBODIMENT

Figure 1:
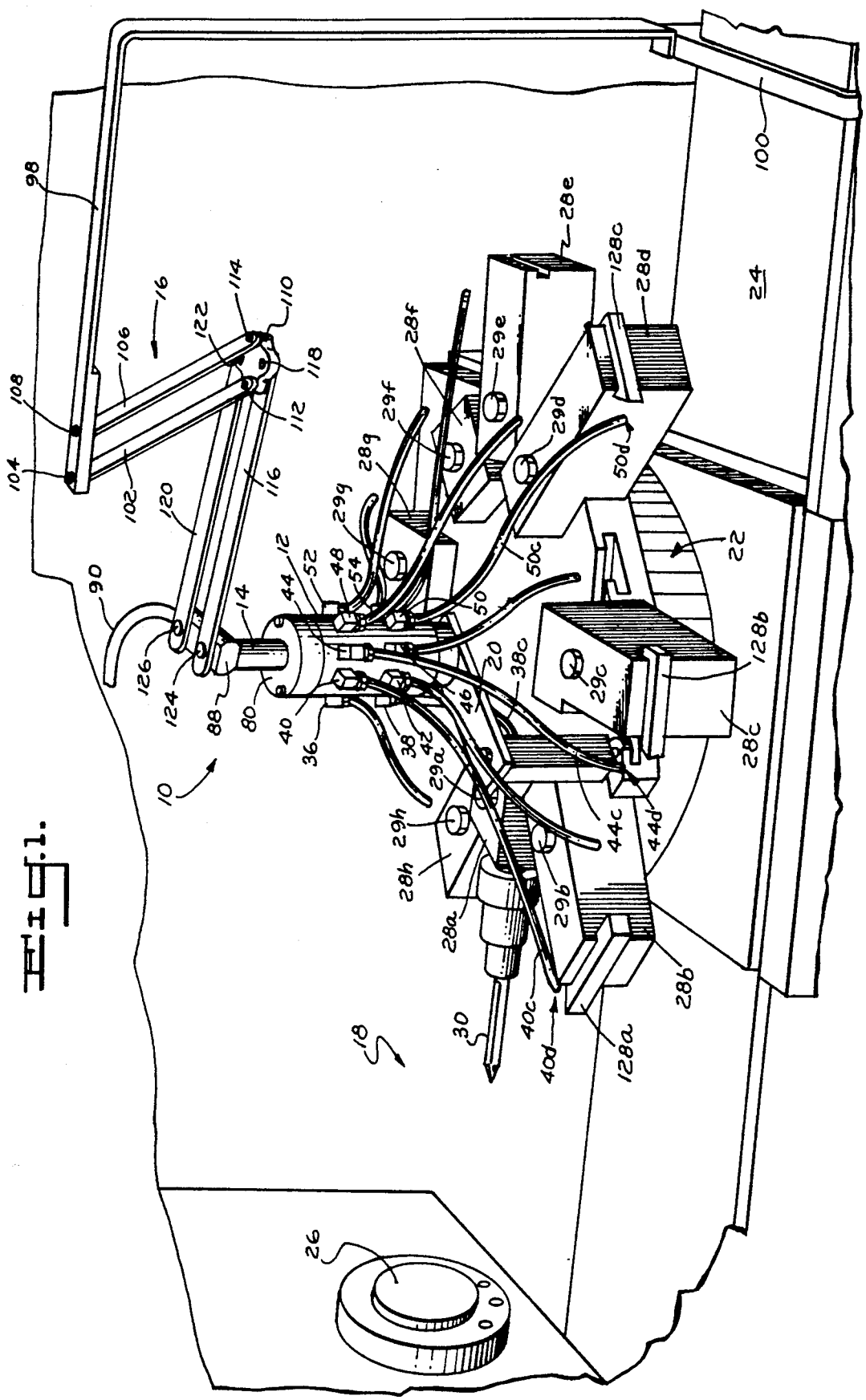
FIG. 1 is a side perspective view of a turret-lathe coolant system constructed in accordance with the present invention, wherein the system is mounted on a conventional turret lathe.

Referring to the drawings in detail, the preferred embodiment of a turret-lathe coolant system is shown and generally designated by the number 10. The system basically comprises a coolant-discharge assembly 12 that selectively directs coolant fluid; a coolant plunger 14 seated within the coolant-discharge assembly 12, that receives coolant fluid and selectively transfers the fluid to the coolant-discharge assembly 12; and a compound, four-bar linkage mechanism 16, pivotally connected to the coolant plunger 14, that secures the plunger 14 to a turret lathe 18. The discharge assembly 12, plunger 14, and compound, four-bar linkage mechanism 16 can be constructed of materials ordinarily utilized in turret-lathe coolant systems, such as stainless steel, aluminum, copper, or plastic.

Figure 2:
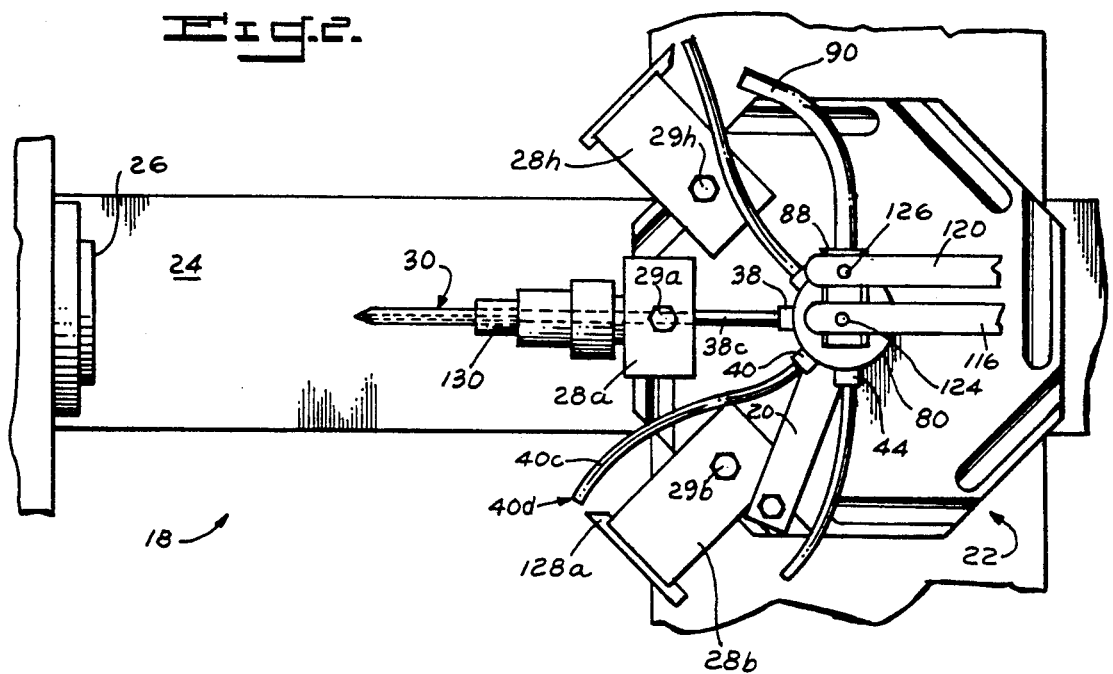
FIG. 2 is a fragmentary top plan view of the turret-lathe coolant system of FIG. 1, showing a first cutting tool aligned with a workpiece mounted on the lathe.
Figure 3:
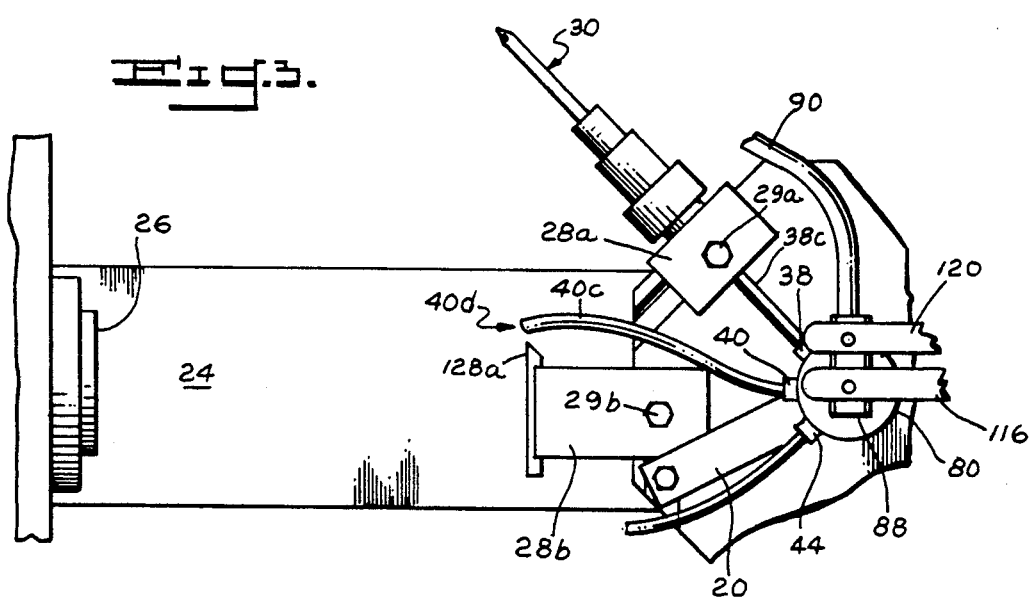
FIG. 3 is a view similar to FIG. 2, but with some components deleted and the first cutting tool rotated.

As best seen in FIG. 1, an upside-down "L"-shaped riser clamp 20 connects the coolant-discharge assembly 12 to a turret 22, that is rotatably secured to a bed 24 of the turret lathe 18. The turret 22 is adapted to move longitudinally and transversely along the bed 24, with respect to a workpiece mount 26 on the turret lathe 18. The workpiece mount 26 is adapted to secure and rotate a workpiece (not shown). The turret 22 includes a plurality of tool mounts 28a-h adapted to secure cutting tools, such as a drill 30, as seen in FIGS. 1-3. Tool-mount bolts 29a-h secure the tool mounts 28a-h to the turret. Riser clamp 20 secures the coolant-discharge assembly 12 so that its rotational axis is aligned with a rotational axis of the turret 22.

Figure 6:
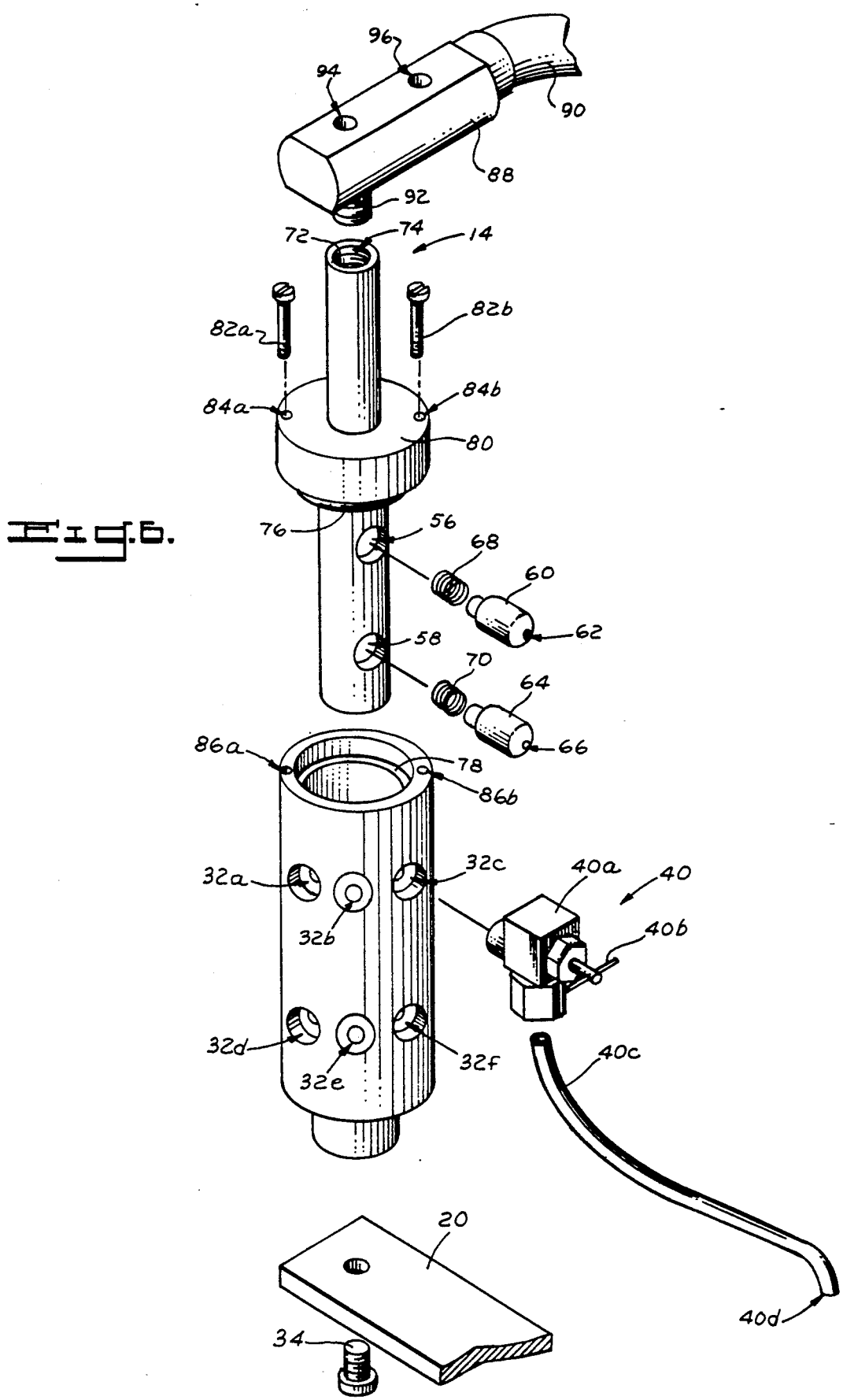
FIG. 6 is an exploded side perspective view of some main components of the turret-lathe coolant system of FIG. 1, showing a coolant plunger removed from a coolant-discharge assembly.

As best seen in FIG. 6, coolant-discharge assembly 12 includes a plurality of substantially identical coolant-distribution ports 32a-f. A riser-clamp bolt 34 is also shown in FIG. 6, that rigidly secures the coolant-discharge assembly 12 to the riser clamp 20. As seen in FIG. i, a plurality of substantially identical coolant-control channels 36, 38, 40, 42, 44, 46, 48, 50, 52, 54 are affixed to the coolant-discharge assembly 12, and control the flow of coolant out of it. As best shown in FIG. 6, each coolant-control channel, such as control channel 40, includes a valve 40a, a digitally manipulable valve actuator 40b, and a coolant tube 40c, having a discharge end 40d. The valve 40a is adapted to be secured within a coolant-distribution port, such as 32c in FIG. 6, and to selectively pass coolant fluid through the coolant tube 40c.

As shown in FIG. 6, coolant plunger 14 is adapted to sit within coolant-discharge assembly 12, and includes a first coolant-discharge outlet 56, and a second coolant-discharge outlet 58. A first positioning rod 60 defines a first throughbore 62, and nests within first coolant-discharge outlet 56. A second positioning rod 64 defines a second throughbore 66, and nests within second coolant-discharge outlet 58. A first positioning spring 68 and a second positioning spring 70 are adapted to mount on the first and second positioning rods 60, 62, respectively, so that the springs contact an interior wall 72 of the coolant plunger, and, when the plunger 14 rests within the coolant-discharge assembly 12, the springs 68, 70 force the positioning rods 60, 64 partially into aligned coolant-distribution ports (such as ports 32c and 32f in FIG. 6), to adjustably align the throughbores 60, 62 with the distribution ports. Interior wall 72 of the coolant plunger 14 defines an interior chamber 74 that is adapted to receive coolant fluid and transmit it through the first and second coolant-discharge outlets 56, 58.

As best seen in FIG. 6, an "O"-ring 76 around coolant plunger 14 rests within an "O"-ring groove 78 in the coolant-discharge assembly 12, to seal the coolant plunger 14 within the assembly 12. A mounting shoulder 80 is rotatably secured to and surrounds coolant plunger 14. Identical mounting bolts 82a, 82b pass through mounting slots 84a, 84b in the mounting shoulder 80, and into threaded mounting bores 86a, 86b in the coolant-discharge assembly 12, to rotatably secure the plunger 14 within the coolant-discharge assembly 12. A coolant-inlet manifold 88 is secured to the coolant plunger 14 to pass coolant fluid from a coolant transfer hose 90, through the manifold 88, out of a manifold-discharge outlet 92, and into the interior chamber 74 of the coolant plunger 14. The coolant-inlet manifold 88 also defines a first securing bore 94 and a second securing bore 96, adapted to pivotally secure the compound, four-bar linkage mechanism 16.

A retrofit means, or, as best seen in FIGS. 1, 4 and 5, a compound, four-bar linkage mechanism 16 adjustably secures the coolant plunger 14 to the bed 24 of the turret lathe 18 by a support arm 98 that is affixed to a bed clamp 100. The compound, four-bar linkage mechanism 16 includes a first bar 102 pivotally affixed to a first pivot pin 104 on the support arm 98; a second bar 106, in parallel alignment with the first bar 102, and pivotally affixed to a second pivot pin 108 on the support arm 98; a pivot plate 110 pivotally affixed to the first bar 102 by third pivot pin 112, and pivotally affixed to the second bar 106 by fourth pivot pin 114, so that the first and second bars 102, 106 remain in parallel alignment, while pivoting about the first and second pivot pins 104, 108; a third bar 116 pivotally affixed to the pivot plate 110 by a fifth pivot pin 118; a fourth bar 120, in parallel alignment with the third bar 116, and pivotally affixed to the pivot plate 110 by a sixth pivot pin 122; a seventh pivot pin 124, pivotally affixed to the third bar 116 and the first securing bore 94 in the coolant-inlet manifold 88; and an eighth pivot pin 126, pivotally affixed to the fourth bar 120 and the second securing bore 96 in the coolant-inlet manifold, so that the third and fourth bars 116, 120 remain in parallel alignment, while pivoting about the fifth and sixth pivot pins 118, 122 on the pivot plate 1110.

In operation of the turret-lathe coolant system 10, an operator (not shown) secures cutting tools in selected tool mounts 28a-h. For example, as shown in FIG. 1, the drill 30 has been secured in mount 28a, and single point cutting tools 128a-c are secured within mounts 28b, 28c and 28d. The operator then adjusts the semirigid coolant tubes 38c, 40c, 44c, 50c, so that their discharge ends 38d (not shown), 40d, 44d, 50d are adjacent the single point cutting tools 128a-c, or directed into a tool mount, to pass through the cutting tool (such as drill 30, wherein coolant fluid can pass through the mount 28a to pass out a throughbore 130 in drill 30). The operator then manipulates the appropriate valve actuators (not shown) to open their respective valves (not shown) affixed to the coolant tubes 38c, 40c, 44c, 50c, that are adjusted to cutting tools indexed by the operator to cut a workpiece (not shown), so that coolant fluid can pass through the coolant-control channels 38, 40, 44, 50 having open valves. The operator adjusts all other valve actuators on coolant-control channels 36, 42, 46, 48, 52, 54 to close their valves (not shown).

The coolant plunger 14 is positioned so that its first and second coolant-discharge outlets 56, 58 are aligned with the tool mount that the operator has indexed to first move toward the workpiece mount 26, and contact a workpiece (not shown). For example, in FIG. 1, the coolant plunger's discharge outlets 56, 58 (shown only in FIG. 6) are positioned so that only coolant-control channels 36 and 38 are aligned with the outlets 56, 58. Therefore, first and second positioning springs 68 and 70 force first and second positioning rods 60, 64 partially into the coolant-discharge ports 32c, 32f (shown only in FIG. 6), so that coolant fluid can only pass through the first and second throughbores 62, 66 of the positioning rods 60, 64 into control channels 36 and 38. In FIG. 1, because coolant-control channel 38 has its coolant tube 38c directed into mount 28a to pass through drill 30, the valve of coolant-control channel 36 is off. Therefore, coolant fluid can only pass through the second coolant-discharge outlet 58 of the coolant plunger. The coolant-discharge assembly 12, coolant plunger 14, and first and second coolant-discharge outlets 56, 58 of the plunger are adapted so that the coolant-discharge assembly 12 and coolant plunger 14 have inner and outer diameters dimensioned respectively to permit the assembly 12 to freely rotate about the plunger 14, and to permit coolant fluid to only pass through the coolant-distribution ports 32 of the assembly 12 that are aligned with and are adjacent to the first and second coolant-discharge outlets 56, 58 of the plunger 14.

The operator next initiates flow of coolant fluid through the coolant-transfer hose 90, the coolant-inlet manifold 88, and into the coolant plunger 14. As shown in FIGS. 1 and 2, the coolant fluid can only flow into the specific coolant-distribution ports (ports 32c and 32f in FIG. 6) adjacent the first and second coolant-discharge outlets 56, 58. The valve (not shown) of coolant-control channel 36 in FIG. 1 adjacent the first coolant outlet 56 has been turned off by the operator, so coolant fluid can only flow through coolant-control channel 38, and into tool mount 28a, and its affixed drill 30. The turret 22 then moves toward the workpiece mount 26 to engage a specified contact between the drill 30 and a spinning workpiece (not shown).

The turret then disengages the drill 30, and rotates, as shown in the sequence depicted in FIGS. 2 and 3, to position tool mount 28b in an alignment to next contact the workpiece. As the turret 22 rotates, riser clamp 20 rotates, causing the coolant-discharge assembly 12 to also rotate, so that coolant-control channels 40, 42 (shown in FIG. 1) are aligned with the first and second coolant-discharge outlets 56, 58 of the coolant plunger 14. Therefore, coolant fluid can only flow into control channels 40, 42, and for the operation shown in FIGS. 1-3, the operator has turned off the valve (not shown) in control channel 42, so coolant fluid only flows through control channel 40, and out of its discharge end 40d, adjacent single point cutting tool 128a. Because, in FIG. 3, coolant-control channel 38 has been rotated out of alignment with the second coolant-discharge port 58, coolant fluid stops flowing through drill 30 after it is rotated out of a working position.

The compound, four-bar linkage mechanism 16 cooperates with the coolant plunger 14 that is rigidly affixed to the coolant-inlet manifold 88, so that the first and second coolant-discharge outlets 56, 58 remain in a fixed position relative to a rotational axis of the turret 22, and therefore stay aligned with the specific tool mount 28a-h that is positioned to move toward the workpiece, as the turret 22 rotates and moves longitudinally or transversely along the bed 24 of the turret lathe 18.

It should be understood by those skilled in the art, that obvious structural modifications can be made without departing from the spirit of the invention. For example, the coolant-discharge assembly 12 ,of the present invention could have any number of coolant-distribution ports 32 arranged on the assembly 12 in patterns that differ from the patterns shown in FIGS. 1, 4 and 6. Also, the coolant plunger 14 similarly could have any number of coolant-discharge outlets 56, 58, arranged in patterns that differ from the pattern shown in FIG. 6. Additionally, the turret-lathe coolant system 10 of the present invention is readily adaptable to a variety of industrial lathes, wherein multiple cutting tools move with respect to a workpiece. Accordingly, reference should be made primarily to the accompanying claims, rather than the foregoing specification, to determine the scope of the invention.

Having thus described the invention, what is claimed is:

1. A turret-lathe coolant system for selectively directing a stream of coolant fluid to an interface between a workpiece on a lathe and a cutting tool positioned adjacent the workpiece by a rotatable turret that secures a plurality of cutting tools and moves longitudinally and transversely along a bed of the lathe to position the cutting tools, the system comprising:

a. a coolant-discharge assembly affixed to the turret so that a rotational axis of the assembly is aligned with a rotational axis of the turret, the discharge assembly having a plurality of coolant-distribution ports adapted to direct coolant fluid out of the discharge assembly to aligned cutting tools on the turret;

b. A coolant plunger secured within the coolant-discharge assembly so that the discharge assembly rotates around the coolant plunger as the turret rotates, the plunger defining an interior chamber adapted to receive coolant fluid and transmit the fluid through a discharge outlet in the plunger to an adjacent coolant-discharge outlet in the plunger to an adjacent coolant-discharge port; and c. retrofit means for securing the coolant plunger to the lathe and maintaining the discharge outlet in a fixed position relative to the rotational axis of the turret as the turret rotates and moves longitudinally and transversely along the bed of the lathe, the retrofit means comprising a compound, four-bar linkage mechanism pivotally affixed to the coolant plunger and the lathe; and d. a spring-biased positioning rod, defining a central throughbore and lying within the discharge outlet, so that a spring forces the positioning rod partially into an adjacent distribution port to adjustably secure alignment of the distribution port with the discharge outlet and permit coolant fluid to pass from the interior chamber of the coolant plunger through the central throughbore and out the distribution port.

2. The turret-lathe coolant system of claim 1, wherein coolant-control channels are affixed to the coolant-distribution ports, the control channels comprising valves adjacent the distribution ports to block or permit the passage of coolant fluid out of the ports, and coolant tubes affixed to the valves to direct the flow of coolant fluid.

3. The turret-lathe coolant system of claim 1, wherein the coolant plunger includes a plurality of discharge outlets.

4. In a turret-lathe coolant system for selectively directing a stream of coolant fluid to an interface between a workpiece on a lathe and a cutting tool positioned adjacent the workpiece by a rotatable turret that secures a plurality of cutting tools and moves longitudinally and transversely along a bed of the lathe to position the cutting tools, wherein the system includes a coolant-discharge assembly affixed to the turret so that a rotational axis of the assembly is aligned with a rotational axis of the turret, the discharge assembly having a plurality of coolant-distribution ports discharge to direct coolant fluid out of the discharge assembly to aligned cutting tools on the turret, wherein coolant-control channels are affixed to the coolant-distribution ports, the control channels comprising valves adjacent the distribution ports to block or permit the passage of coolant fluid out of the ports, and coolant tubes affixed to the valves to direct the flow of coolant fluid, and a coolant plunger secured within the coolant-discharge assembly so that the discharge assembly rotates around the coolant plunger as the turret rotates, the plunger defining an interior chamber adapted to receive coolant fluid and transmit the fluid through a discharge outlet in the plunger to an adjacent coolant-discharge port, the improvement comprising a coolant-inlet manifold secured to the coolant plunger and adapted to receive coolant fluid and transfer it into the interior chamber of the coolant plunger, wherein the coolant-inlet manifold is adapted to be adjustably secured to the lathe by retrofit means which further comprises means for maintaining the discharge outlet in a fixed position relative to the rotational axis of the turret as the turret rotates and moves longitudinally and transversely along the bed of the lathe, and comprising a spring-biased positioning rod, defining a central throughbore and lying within the discharge outlet, so that a spring forces the positioning rod partially into an adjacent distribution port to adjustably secure alignment of the distribution port with the discharge outlet and permit coolant fluid to pass from the interior chamber of the coolant plunger through the central throughbore and out the distribution port.

5. The turret-lathe coolant system of claim 4, wherein the coolant plunger includes a plurality of discharge outlets.

6. A turret-lathe coolant system for selectively directing a stream of coolant fluid to an interface between a workpiece on a lathe and a cutting tool positioned adjacent the workpiece by a rotatable turret that secures a plurality of cutting tools and moves longitudinally and transversely along a bed of the lathe to position the cutting tools, the system comprising:

a. a coolant-discharge assembly affixed to the turret so that a rotational axis of the assembly is aligned with a rotational axis of the turret, the discharge assembly having a plurality of coolant-distribution ports adapted to direct coolant fluid out of the discharge assembly to aligned cutting tools on the turret;

b. a coolant plunger secured within the coolant-discharge assembly so that the discharge assembly rotates around the coolant plunger as the turret rotates, the plunger defining an interior chamber adapted to receive coolant fluid and transmit the fluid through a discharge outlet in the plunger to an adjacent coolant-discharge port; and c. a compound, four-bar linkage mechanism pivotally affixed to the coolant plunger and the lathe that maintains the discharge outlet in a fixed position relative to the rotational axis of the turret as the turret and affixed discharge assembly rotate and as the turret moves longitudinally and transversely along the bed of the lathe.

7. The turret-latch coolant system of claim 6, wherein coolant-control channels are affixed to the coolant-distribution ports, the control channels comprising digitally manipulable valves adjacent the distribution ports to block or permit the passage of coolant fluid out of the ports, and coolant tubes affixed to the valves to direct the flow of coolant fluid.

8. The turret-lathe coolant system of claim 7, further comprising a spring-biased positioning rod, defining a central throughbore and lying within the discharge outlet, so that a spring forces the positioning rod partially into an adjacent distribution port to adjustably secure alignment of the distribution port with the discharge outlet and permit coolant fluid to pass from the interior chamber of the coolant plunger through the positioning rod's central throughbore and out the distribution port.

9. The turret-lathe coolant system of claim 8, wherein the coolant plunger includes a plurality of discharge outlets.

* * * * *